(12) United States Patent
Blach

(10) Patent No.: US 8,434,928 B2
(45) Date of Patent: May 7, 2013

(54) EXTRUDER HAVING PARALLEL SHAFTS WITH COMBINED ELEMENTS

(75) Inventor: Josef A. Blach, Lauffen (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 928 days.

(21) Appl. No.: 11/666,267

(22) PCT Filed: Oct. 7, 2005

(86) PCT No.: PCT/EP2005/010791
§ 371 (c)(1),
(2), (4) Date: Mar. 28, 2008

(87) PCT Pub. No.: WO2006/045412
PCT Pub. Date: May 4, 2006

(65) Prior Publication Data
US 2009/0040863 A1 Feb. 12, 2009

(30) Foreign Application Priority Data
Oct. 26, 2004 (DE) .......................... 10 2004 052 055

(51) Int. Cl.
*B29B 7/48* (2006.01)
*B29C 47/42* (2006.01)

(52) U.S. Cl.
USPC ................................. 366/82; 366/85; 366/88

(58) Field of Classification Search ............ 264/211.23; 366/301, 79–91; 425/204, 208, 209
See application file for complete search history.

(56) References Cited

U.S. PATENT DOCUMENTS

| | | | | |
|---|---|---|---|---|
| 2,453,088 A | * | 11/1948 | Dulmage | 366/82 |
| 4,120,920 A | | 10/1978 | Cougoul et al. | |
| 4,300,839 A | * | 11/1981 | Sakagami | 366/85 |
| 4,334,785 A | | 6/1982 | Blach | |
| 4,447,156 A | * | 5/1984 | Csongor | 366/80 |
| 4,600,311 A | | 7/1986 | Mourrier et al. | |
| 4,940,329 A | * | 7/1990 | Dienst | 366/75 |
| 5,044,757 A | * | 9/1991 | Dienst | 366/76.6 |
| 5,129,729 A | * | 7/1992 | Geyer | 366/81 |
| 5,217,303 A | * | 6/1993 | Geyer | 366/88 |
| 5,234,656 A | * | 8/1993 | Kniss | 264/328.18 |
| 5,318,358 A | | 6/1994 | Wobbe et al. | |

(Continued)

FOREIGN PATENT DOCUMENTS

| | | |
|---|---|---|
| DE | 2 236 902 | 2/1974 |
| DE | 23 40 499 | 1/1975 |

(Continued)

OTHER PUBLICATIONS

Machine translation of DE 2340499 (EPO) generated Mar. 5, 2011.*

(Continued)

*Primary Examiner* — Charles E Cooley
(74) *Attorney, Agent, or Firm* — Miller Canfield Paddock and Stone; Mark L Maki

(57) ABSTRACT

In the case of an extruder with at least two parallel, rotating shafts turning in the same direction, the shafts are equipped with interlocking feed screw segments (24) and working segments (26). The working segments (26), which lead to a greater spread between the two shafts than the feed screw segments (24), are formed as a single piece as a combined element (22) using the feed screw segment (24).

20 Claims, 4 Drawing Sheets

U.S. PATENT DOCUMENTS

| | | | |
|---|---|---|---|
| 5,417,992 A * | 5/1995 | Rizvi et al. | 426/283 |
| 5,429,435 A * | 7/1995 | Blach | 366/83 |
| 5,630,968 A * | 5/1997 | Wang et al. | 264/53 |
| 5,836,682 A | 11/1998 | Blach | |
| 5,851,065 A | 12/1998 | Ikeda et al. | |
| 5,951,159 A * | 9/1999 | Schobert-Csongor et al. | 366/76.4 |
| 6,022,133 A * | 2/2000 | Herring et al. | 366/85 |
| 6,227,693 B1 * | 5/2001 | Blach et al. | 366/85 |
| 6,241,375 B1 * | 6/2001 | Wang | 366/82 |
| 6,331,069 B1 * | 12/2001 | Putti | 366/89 |
| 7,270,471 B2 * | 9/2007 | Blach | 366/85 |
| 7,425,090 B2 * | 9/2008 | Blach | 366/85 |
| 8,172,450 B2 * | 5/2012 | Blach | 366/83 |
| 2005/0024986 A1 | 2/2005 | Mattingly | |
| 2005/0084559 A1 * | 4/2005 | Blach | 425/208 |
| 2005/0152214 A1 * | 7/2005 | Blach | 366/85 |
| 2009/0040863 A1 * | 2/2009 | Blach | 366/85 |
| 2009/0274003 A1 * | 11/2009 | Blach | 366/84 |
| 2010/0067320 A1 * | 3/2010 | Blach et al. | 366/85 |
| 2012/0188840 A1 * | 7/2012 | Blach | 366/85 |

FOREIGN PATENT DOCUMENTS

| | | | |
|---|---|---|---|
| DE | 25 13 015 | | 10/1976 |
| DE | 37 09 798 A1 | | 10/1988 |
| DE | 3709798 A1 | * | 10/1988 |
| DE | 39 40 954 A1 | | 6/1991 |
| DE | 44 44 370 A1 | | 6/1996 |
| DE | 102 33 213 A1 | | 2/2004 |
| EP | 0 422 272 A1 | | 10/1989 |
| EP | 0 788 867 B1 | | 1/1997 |
| FR | 2 472 970 | | 7/1981 |
| JP | 02286208 A | * | 11/1990 |
| WO | WO 87/06523 | | 11/1987 |
| WO | WO 2004009326 A1 | * | 1/2004 |

OTHER PUBLICATIONS

International Search Report dated Sep. 1, 2006.

* cited by examiner

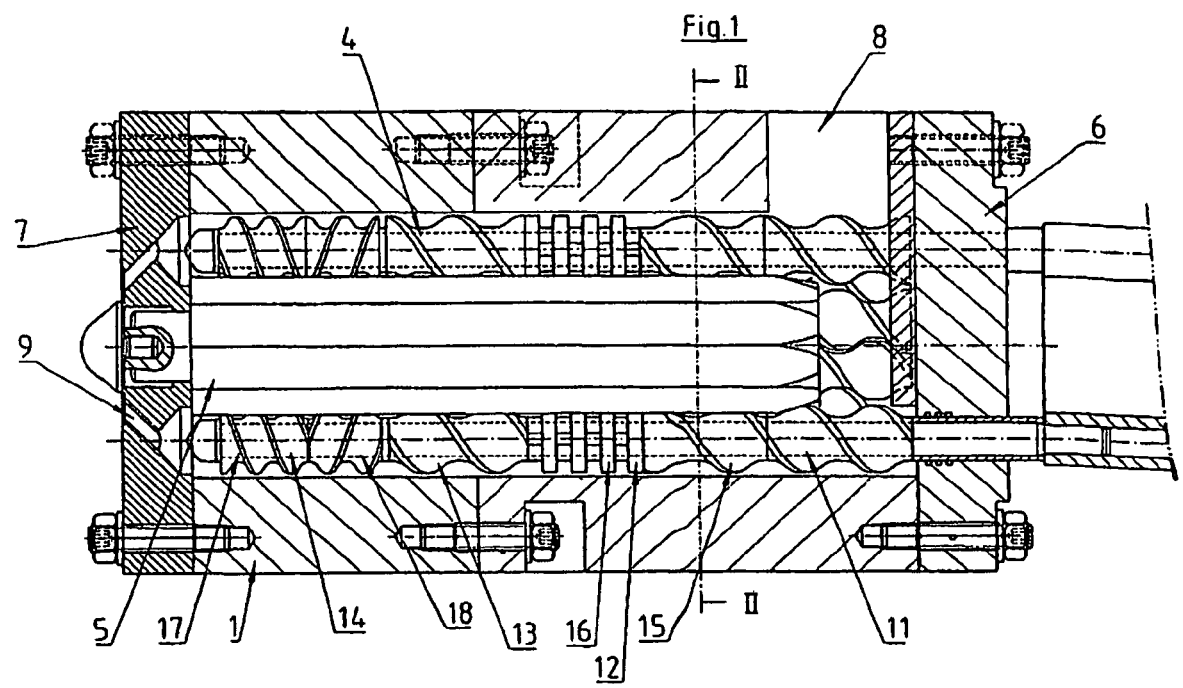
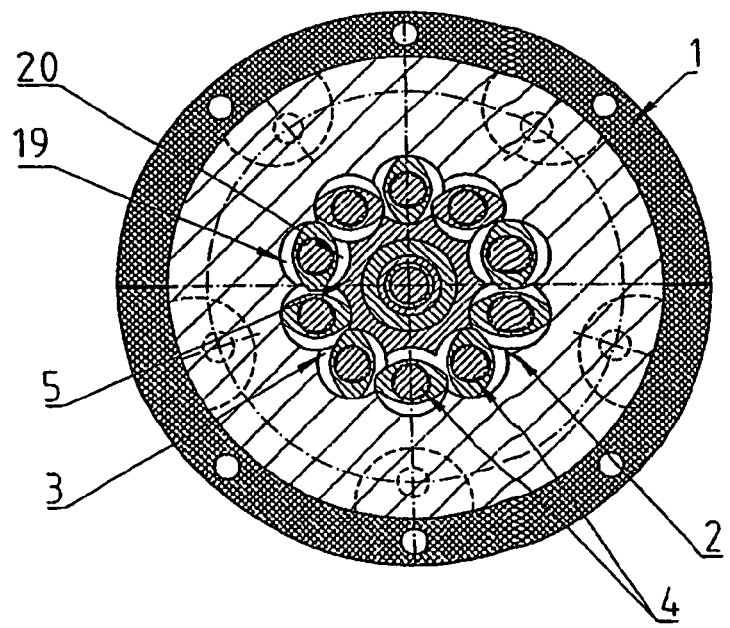

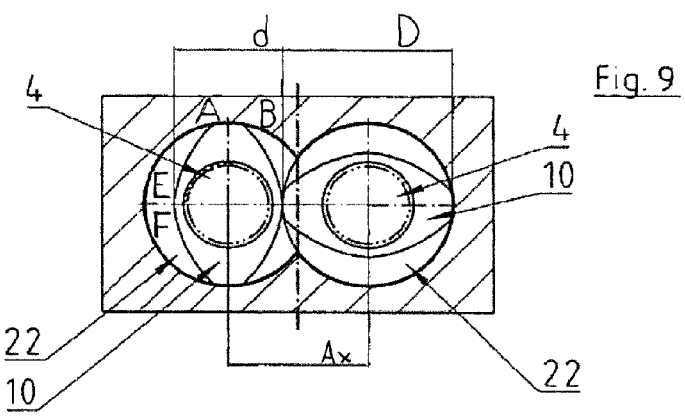
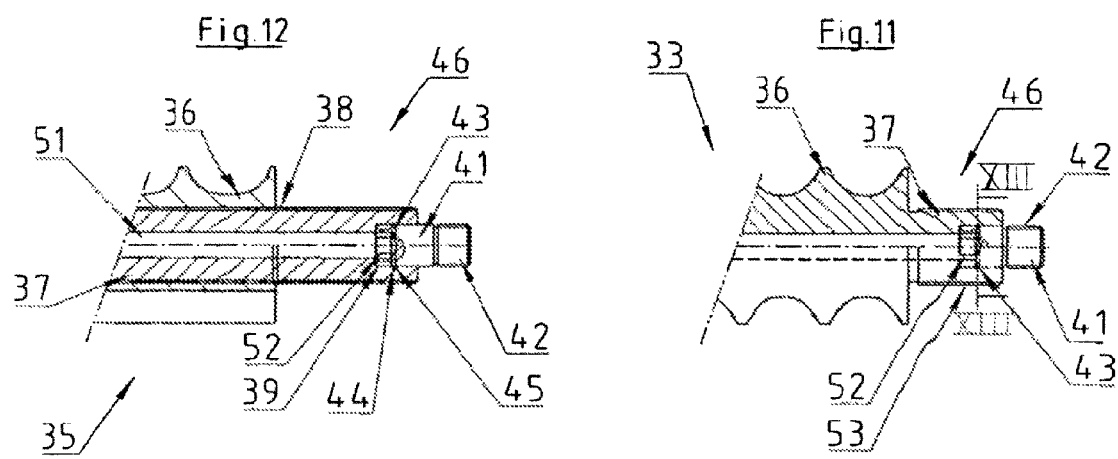

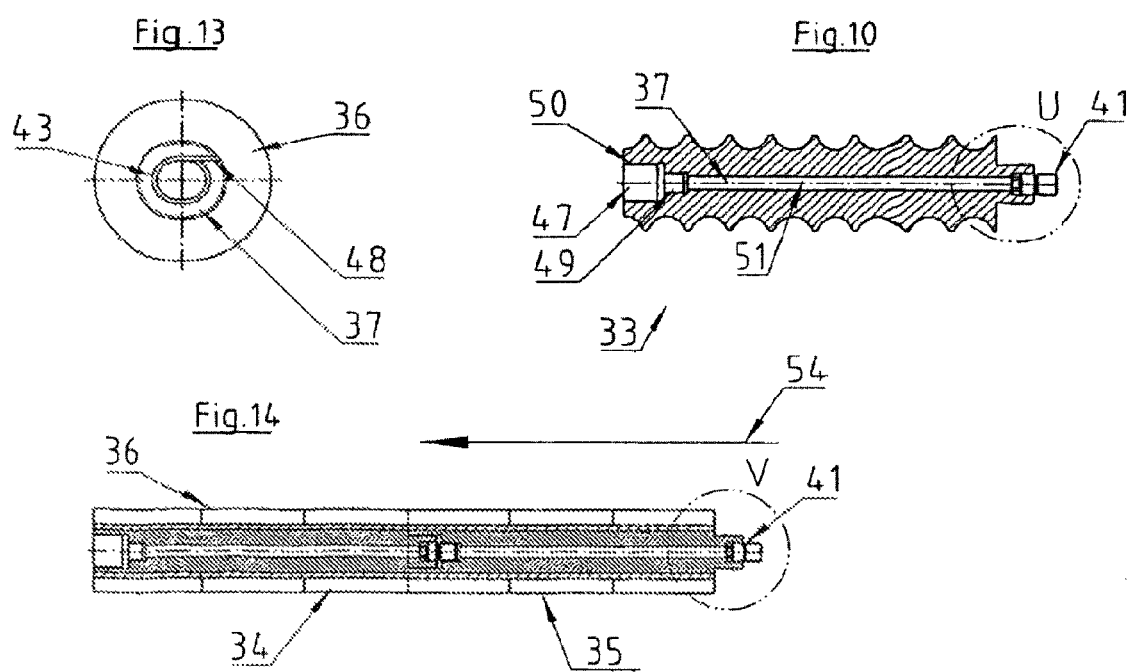

EXTRUDER HAVING PARALLEL SHAFTS WITH COMBINED ELEMENTS

FIELD OF INVENTION

The invention refers to an extruder for the continuous processing and/or treatment of free-flowing materials with at least two shafts rotating in the same direction, which are equipped with interlocking feed screw segments and working segments and guided in circle segment-shaped recesses in the extruder housing parallel to the shafts.

BACKGROUND OF THE INVENTION

The shafts equipped with the feed screw segments and the working segments can also be arranged in a hollow space in the extruder housing along a circle with the same central angle (EP 0 788 867 B1). Whilst the feed screw segments formed from individual elements feed the material to be processed in the extruder from the material feed opening to the material exit opening at the other end of the extruder, at the same time the working segments shaped as individual elements have a braking and, if necessary, a reversing function. As the working elements, kneading blocks, as known from EP 0 422 272 A1, for example, can be used, or so-called blisters, i.e. baffle plates with a diameter of the same size as the outer diameter of the screw, which can also be equipped as a so-called toothed disk with external teeth.

Instead of such working elements that compress the material, pressure relieving working elements are also used. For example, from DE 102 33 213 A1, a screw element is known that has a feed-neutral, pressure-relieving section which is formed through wearing of the screw at the screw cog.

The working elements, which have different surfaces for different process tasks, can be combined with each other in almost any way to optimally take into account the respective total technical process requirements. The feed screw elements and working elements are lined up tightly to each other and are placed on the carrier shafts in a torque-proof manner and, positioned accurately both radially and axially, are driven in a co-ordinated manner by the drive.

Due to special technical process requirements, working elements are frequently reduced in length to up to one sixth of the screw diameter and are almost always shorter than the screw diameter. On the other hand, high pressure can occur between the interlocking working elements of two adjacent shafts, particularly if these elements, such as reversing screw elements, kneading blocks, blisters or toothed disks, have a diameter that corresponds to the external sectional diameter. In this way, forces occur in double screw extruders around such working elements that lead to a considerable spread between the shafts. These forces also lead to considerable wear in multiple shaft extruders where the shafts are arranged around a circle with the same central angle.

SUMMARY OF THE INVENTION

The task of the invention is to reduce the above-average wear around the working elements.

In the invention, this is achieved by the working segments, which lead to a larger spread between two shafts than feed screw segments, being formed by a single-piece combined element comprising at least one feed screw segment and/or at least one further working segment.

The working segment which is united with a feed screw segment to form a combined element made as one piece can be a reversing working segment with a diameter corresponding to the screw diameter, particularly a screw segment with a smaller pitch than the feed screw segment or a pitch direction counter to the feed screw segment or a kneading block, a blister or a toothed disk. However, two working segments can also be united as an element made as one piece, e.g. two kneading blocks with opposing pitch directions or a screw segment with an opposing pitch direction and a kneading block.

By uniting a feed screw segment and a working segment, or two working segments into a longer combined element in accordance with the invention, the bending strength of the shafts is significantly improved. At the same time, the spreading forces are distributed over a larger, generally better lubricated surface and thus the surface load and therefore the wear are significantly reduced. In addition, the combination of several different technical process requirements that can be located in a segment over a relatively short length brings with it a decisive reduction in the number of parts, which results in a significant simplification of the equipment and maintenance of the shafts as well as their storage.

In order to simplify the equipping of the shafts, the face surfaces of the combined elements in the invention are delimited by circular arcs, which correspond to the feed screw diameter, the feed screw core diameter and are no larger than the centre distance of the axes of the shafts. The combined elements can then simply be placed on the shafts in such a way that the face surfaces delimited by the circular arcs align with each other. Thus fault-free mounting of the combined elements that interlock with the combined elements of the adjacent shaft is made significantly easier.

So that the benefits of the combined elements take effect with regard to bending strength and wear, the combined element has a length greater than the diameter of the screw, and specifically, more than double the diameter of the screw.

The feed screw segment of the combined element is preferably designed with a double lead, as a double-lead screw leads to a larger feed quantity than a triple-lead screw, but compared to a single-lead screw has a greater bending strength.

If a working segment of the combined element also has a screw-shaped surface, i.e. a screw segment with a smaller pitch or counter pitch direction, this is also preferably designed with a double lead. The surface of the working segment can also simply have a spiral shaped progression similar to a screw, for example in the case of kneading blocks. So in accordance with the invention, a kneading block segment with double-lead cam plates arranged in a spiral that have a pitch direction in accordance with the feed screws, for example, can be combined with a double-lead kneading block segment with an opposing pitch direction to form one element.

With the high temperatures to which the material being processed is subjected, the shafts and the feed and working elements sitting on them expand differently. This results in the formation of a gap between the shaft and the elements sitting on them, into which the molten material, such as plastic, can penetrate and possibly combust, and in any case can bind the shaft with the elements so firmly that the elements can only be withdrawn from the shaft after cooling with the greatest of difficulty.

This problem is accentuated in the long combined elements used in the invention to such an extent that at times the elements cannot be withdrawn at all and the whole shaft has to be discarded.

In accordance with the invention therefore, each shaft is preferably divided into several shorter shaft sections, whereby the shaft sections are formed to be able to be axially distorted in the shaft core. For the axial distortion ability, an axially fixed rotating element is preferably pivoted at one end of the shaft section in the shaft core, which is equipped in a torque-proof manner with an external thread, which engages in the inner thread in the core of the adjacent shaft section. For this, the shaft section can have at one end a rotating element with an external thread and on the other end the inner thread in the core. There can also be shaft sections that at both ends have such rotating elements with external threads and which are connected to shaft sections that have internal threads in the core at both ends.

In the shaft core of the shaft section, there is preferably an axial bore hole or similar recess so that the rotating element can be activated. For this, the rotating element can be equipped on its side facing the axial recess of the shaft section with a polygon or polygonal recess, for example a hexagonal recess or peg, which is operated through a rod inserted in the axial bore hole of the shaft core, equipped at its end with a corresponding opposing polygon. Instead of a polygonal recess or a polygonal peg, naturally another activating recess or activating projection can be designed on the rotating element which is activated through a rod correspondingly designed at its end, inserted in the axial bore hole in the shaft core.

Each shaft section with the torque-proof elements arranged on it is connected in a torque-proof manner with the adjacent shaft section. To do this, there is an interlocking, torque-proof connection between two adjacent shaft sections, for example using serrated or wedge-shaped teeth on the external perimeter of the end of the shaft core, to which the rotating element is pivoted, whereby the teeth work together on the external perimeter using serrated or wedge-shaped teeth in a hub bore hole at the end of the adjacent shaft section, where the internal thread is located into which the external thread on the rotating element of the adjacent shaft section engages.

The combined element with a working segment and at least one feed screw segment and/or at least one additional working segment can be formed with the shaft core of the shaft segment as one piece. However, it is also possible to design the screw core of the shaft section for mounting one or more combined elements in a torque-proof manner.

Through the elements combined as one piece in the invention, the bending strength of the shaft is significantly increased to a certain length so that transverse forces that are produced are better distributed over a larger surface area and thus wear is reduced. In addition, in the invention the number of components is reduced, which has a beneficial effect on both storage and assembly and dismantling. Furthermore, short working segments are integrated, for example working segments with a length that is smaller than one half of the feed screw diameter, and also those that are not covered by the type charts, e.g. through their structural length and/or placement position. Placement errors can also be safely avoided in the case of complicated arrangements. The number of tight spots is also drastically reduced and the process space is radially close on a certain machine length to an internally guided shaft.

The extruder in the invention can be formed as a double shaft extruder. However, it will preferably have three or more shafts arranged in a cavity in the extruder housing along a circle or circular arc with the same central angle.

BRIEF DESCRIPTION OF THE DRAWINGS

Below, the invention is described in more detail using the enclosed drawings. They show the following:

FIG. 1 shows a longitudinal section through a multi-shaft extruder;

FIG. 2 shows a cross-section along line II-II in FIG. 1;

FIG. 9 shows a cross-section through a two-shaft extruder with closely interlocking screw segments around the whole perimeter;

FIG. 10 shows a longitudinal section through a shaft section with the element combined with it and formed as one piece;

FIG. 11 shows a view of the right end of the shaft section according to FIG. 10;

FIG. 12 shows a view corresponding to FIG. 11, but of a shaft section with a combined element placed on the shaft core;

FIG. 13 shows a cross-section along the line XIII-XIII in FIG. 11; and

FIG. 14 shows a longitudinal section through a shaft made from several shaft sections with combined elements in place.

DETAILED DESCRIPTION

Figure 3:
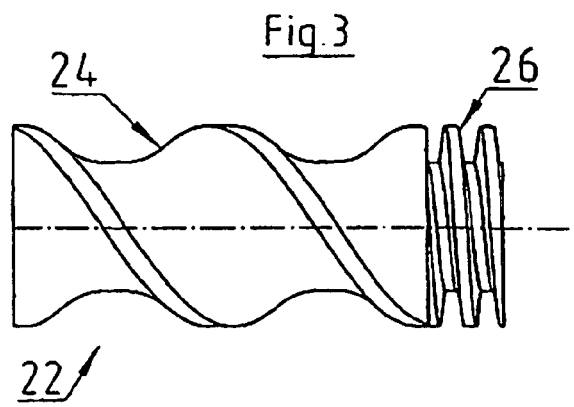
FIGS. 3 and 4 show a side view and a face view of a combined feed screw and working element

In accordance with FIGS. 1 and 2, an extruder in a housing 1 has a space 2 which extends along a circle 3. In the space 2 are a number of shafts 4 arranged parallel to the axis around a core 5. The housing 1 is closed at the face sides with end plates 6 and 7. The shafts 4 extending through the end plate 6 are driven in the same direction by a drive that is not shown. The material feed opening is identified as 8 and the material exit opening in the end plate 7 is identified as 9.

There are several elements 11, 12, 13, 14 placed in a torque-proof manner on each shaft 4 using wedge-shaped teeth. Whilst elements 11 and 13 are formed by a feed screw segment, element 12 consists of a feed screw segment 15 and a kneading block 16, and element 14 of a feed screw segment 17 with a smaller pitch than that of the feed screw elements 11 and 13, as well as a short screw segment 18 with an opposing pitch. The kneading block segment 16 and the short screw segment 18 with an opposing pitch represent the working segments. On the inner side of the housing 1 and on the core 5 are recesses 19 and 20, parallel to the axis and shaped as circular segments, in which the feed screw elements 11 and 13 and the combined elements 12 and 14 engage with limited play, i.e. to the greatest degree of tightness. At the same time, the feed screw elements 11 and 13 and the combined elements 12 and 14 interlock tightly in each other to a large extent.

Figure 4:
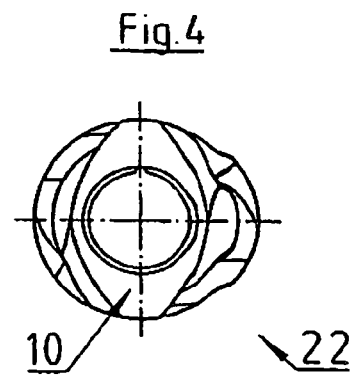

FIGS. 3 and 4, as well as 5 and 6, show two other combined elements 22, 23 made from one feed screw segment 24 or 25 and one working segment 26 or 27, which are each formed through a screw segment with a smaller pitch than that of the feed screw segment 24 or 25, whereby the working segment 27 is designed to be shorter than the working segment 26.

Figure 7:
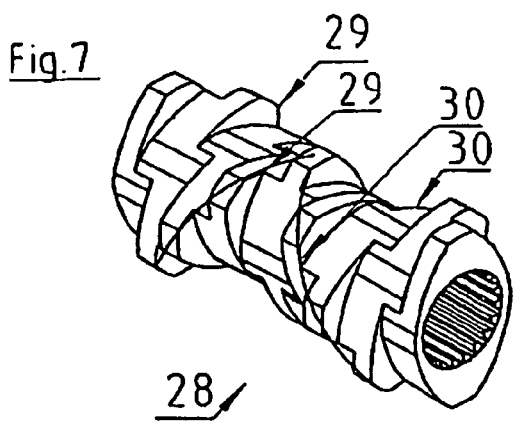
FIGS. 7 and 8 show a perspective view and face view of an element combined from one kneading block element with a pitch and one kneading block segment with an opposing pitch.
Figure 8:
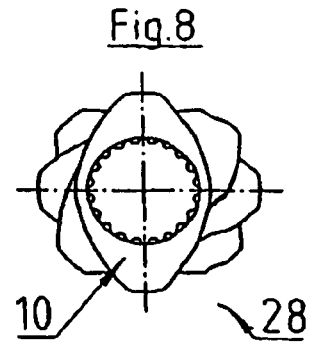

FIGS. 7 and 8 show a combined element 28, which consists of a kneading block segment 29 made from cam disks which, as indicated by the dotted line 29', is arranged with a pitch direction in accordance with a feed screw element, and a kneading block segment 30 made from can disks, which, as indicated by the dotted line 30', are arranged with opposing pitch directions. This means that in this design form, two kneading block segments 29 and 30 as working segments with different functions are combined into one element 28.

As shown in FIG. 9, two interlocking combined elements 22 have a face 10 which is delimited by the circular arcs A-B, E-F and A-E. The circular arc A-B has a diameter that corresponds to the screw diameter D, the circular arc E-F has a diameter that corresponds to the screw core diameter d, and the circular arc A-E has a diameter the radius of which corresponds to the axis distance Ax of both combined elements 22 (see also EP-B-0002131). In the same way, the face 10 of the combined elements 22 and 28 is formed in accordance with FIGS. 3 and 4 and/or 7 and 8. As can be seen in the drawings, the working segments 26 have a working segment diameter along a working segment length and the feed screw segments 24 have a feed screw diameter along a feed segment length wherein the working segment diameter corresponds to the diameter and the feed screw diameter correspond to the circular arcs A-B of the combined elements 22 as shown in FIGS. 3 and 9.

Figure 5:
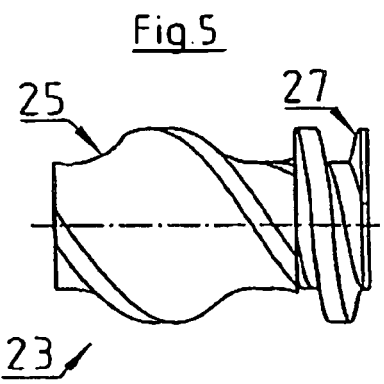
FIGS. 5 and 6 show a side view and a face view of a combined element in accordance with FIG. 1, but with a short working segment and thus a different face wall.
Figure 6:
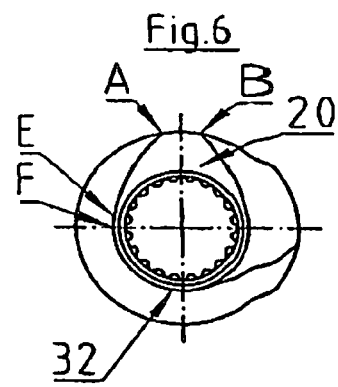

The combined element 23 in accordance with FIGS. 5 and 6 also has a face 20 which is delimited by the circular arcs A-B, E-F' and A-E, but additionally by the circular arc 32, which corresponds to a semicircle with the diameter of the screw core.

Through the combined elements' faces formed from these circular arcs, the equipping of the shafts is significantly simplified, as the elements only have to be equipped so that their faces align with each other.

Each shaft 4 is divided into several short shaft sections that can be different formed. Thus with the shaft section 33 according to FIGS. 10 and 11, the shaft core 37 and the schematically depicted combined element 36 are formed as one piece, whilst in the case of the shaft sections 34, 35 in FIGS. 12 and 14, the schematically represented combined elements 36 are placed on the shaft core 37 in a torque-proof way using wedge-shaped teeth 38.

The shaft sections 33, 34, 35 are designed to be able to be axially deformed under tension in the shaft core 37. For this, a cylindrical rotating element 41 pivots at the end of each shaft section 33, 34, 35 in an axial recess 39 in the shaft core 37. At its end that protrudes from the axial recess 39, the rotating element 41 has an external thread 42.

To axially attach the rotating element 41, there is a wire ring 43 which engages on one side in a perimeter groove 44 in the cylindrical axial recess 39 in the shaft core 37 and on the other in a perimeter groove 45 in the external perimeter of the cylindrical rotating element 41.

The wire ring 43 is formed, as can be seen in FIG. 13, by a wire being pushed between the perimeter grooves 44, 45 through a tangential bore hole 48 in the shaft core 37 from the side.

As can be seen in FIG. 10, to connect the shaft sections there is a coaxial internal thread 49 on the other end of the shaft section 33 in the shaft core 37, into which the coaxial external thread 42 of the adjacent shaft section 33 can be screwed.

In order to increase the bending strength, the shaft core 37 protrudes at the end of the shaft section 33 on which the rotating element 41 is arranged, whereby the axial peg formed by the protruding shaft core end 46 is inserted in the end of the adjacent shaft recess 33 where, on the inner side of the axial recess 47, the axial recess has an internal thread 49.

To activate the rotating element 41, the shaft core 37 has a continuous axial bore hole or similar recess 51. The rotating element 41 can, for example, have a hexagonal recess 52, in which a hexagon, which is not shown, is attached to a rod which is inserted through the axial bore hole 51 in order to turn the rotating element 41 and thus screw the external thread 42 either in or out of the internal thread 49 of the adjacent shaft section 33, in order to connect or detach the adjacent shaft section. Each shaft section 33 is formed in a torque-proof manner using the adjacent shaft section 33. For this, there are wedge-shaped teeth 53 on the peg 46 in accordance with FIG. 11, which engage with the wedge-shaped teeth 50 in the axial recess 47 of the adjacent shaft recess 33. In the case of the design form in accordance with FIG. 12, the wedge-shaped teeth 38 on the shaft core 37 used for the elements 36 are additionally used.

In FIG. 14, the direction of extrusion is indicated with an arrow 54. The direction for assembling the shaft from the shaft sections 34, 35 also corresponds to the direction of the arrow 54, whilst the direction of dismantling runs counter to the direction of the arrow 54. It can be seen that the ends of the shaft sections 34, 35 are each equipped on their upstream end with a rotating element 41 with reference to the direction of extrusion 54.

The invention claimed is:

1. An extruder for the continuous processing and/or treatment of free-flowing materials, with at least two parallel shafts that turn in the same direction, witch are equipped with interlocking feed screw segments and working segments and are guided in recesses in an extruder housing which said recesses are parallel to the shaft and shaped as circle segments, comprising the improvement wherein the working segments that lead to a greater spread between the two shafts than do the feed screw segments, form single-piece combined elements with at least one said feed screw segment being provided in one piece with at least one said working segment, said working segments have a working segment diameter along a working segment length and said feed screw segments having a feed screw diameter along a feed segment length wherein said working segment diameter corresponds to said feed screw diameter so as to be substantially the same, the working segment formed in one piece with said at least one feed screw segment being one of a screw element with a smaller pith than the feed screw segment, a screw segment with an opposing pitch direction opposite to a pitch direction of said feed screw segment, a kneading block, a blister or a toothed disk.

2. Extruder according to claim 1, characterized in that each of the comprises a shaft axis and a screw core defining a screw core diameter, and the feed screw segments are each defined by said feed screw diameter, the combined elements defining respective faces, wherein the faces of the combined elements are delimited by circular arcs, which correspond to the feed screw diameter, and to the screw core diameter and are no larger than an axis distance defined between the axes of the shafts.

3. Extruder according to claim 2, characterized in that at least one part of the combined elements is additionally delimited on at least one face by a circular arc which corresponds to a semicircle with the screw core diameter.

4. Extruder according to claim 1, characterized in that the combined element is formed as a double lead.

5. Extruder according to claim 1, characterized in that each of the feed screw segments is defined by a feed screw and the combined element has a length that is greater than the feed screw diameter.

6. Extruder according to claim 1, characterized in that each shaft has a shaft core and is divided into several short shaft sections disposed one adjacent to the other, and the shaft sections of the shaft are designed to be able to deform under axial tension in the shaft core.

7. Extruder according to claim 6, characterized in that an axially fixed rotating element is pivoted on at least one end of the shaft sections in the shaft core and is equipped in a torque-proof manner with an external thread, which engages in an internal thread in the shaft core of the adjacent shaft section.

8. Extruder according to claim 7, characterized in that the shaft core is equipped with an axial recess for activating the rotating element.

9. Extruder according to claim 8, characterized in that the rotating element is equipped with a polygon for activating an opposing polygon introduced into the axial recess.

10. Extruder according to claim 7, characterized in that the rotating element is arranged at the upstream end of the shaft section.

11. Extruder according to claim 6, characterized in that a wire ring which engages between a perimeter groove in the rotating element and a perimeter groove in the shaft core is provided for the axial fixing of the rotating element.

12. Extruder according to claim 11, characterized in that each shaft section is connected in a torque-free manner with the adjacent shaft section.

13. Extruder according to claim 6, characterized in that the shaft core has a protruding shaft core end which axially protrudes at least on one end of the shaft section over the combined element and the protruding shaft core end engages in an axial recess in the shaft section adjacent thereto.

14. Extruder according to claim 13, characterized in that the protrusion of the protruding shaft core end is at least one half of the diameter of the feed screw.

15. Extruder according to claim 13, characterized in that for interlocking, torque-proof connection, the protruding shaft core end has wedge-shaped teeth that engage in corresponding wedge-shaped teeth in the axial recess in the adjacent shaft section adjacent thereto.

16. Extruder according to claim 6, characterized in that the shaft core and the combined element are formed as a single piece.

17. Extruder according to claim 6, characterized in that the combined element is formed on a respective one the shaft section for torque-proof placement.

18. Extruder according to claim 1, characterized by at least three shafts arranged in a space in an extruder housing along a circle or circular arc with the same central angle.

19. An extruder for continuous processing free-flowing material that includes an extruder housing with a material feed opening, a material exit opening and parallel recesses which extend axially, and at least two parallel shafts which turn in the same direction and which include interlocked feed screw segments and working segments along a shaft axis, said recesses being parallel to said shaft and shaped as circle segments for guiding said shafts during shaft rotation, said feed screw segments moving said free-flowing materials along said shafts from said material feed opening to said material exit opening, and said working segments being configured for processing of said free-flowing materials moving along said shafts, said working segments have a working segment diameter along a working segment length and said feed screw segments having a feed screw diameter along a feed segment length wherein said working segment diameter corresponds to said feed screw diameter so as to be substantially the same, said working segment of said parallel shafts generate spreading forces acting transverse to said axis of each of said shafts during shaft rotation wherein said spreading forces tend to spread said shafts greater than any spreading tendency generated by said feed screw segments, said shafts comprising a plurality of one-piece combined element which comprise at least a first said working segment, which generate said spreading forces tending to spread said shafts greater than any spreading tendency generated by said feed screw segments, and also comprise at least a first one of said feed screw segments wherein said first working segment and one feed screw segment are provided in a one-piece combination to define said combined element, said first working segment being one of a screw element with a smaller pitch than said feed screw segments, a screw segment with an opposing pitch direction opposite to a pitch direction of said one feed screw segment, a kneading block, a blister or a toothed disk, said shaft having a shaft diameter wherein said combined element has an axial element length greater than the shaft diameter to provide bending strength along said element length.

20. Extruder according to claim 19, wherein said element length is at least double the shaft diameter.

* * * * *